US012798980B2

(12) United States Patent
Mattke et al.

(10) Patent No.: US 12,798,980 B2
(45) **Date of Patent: *Nov. 17, 2026**

(54) PROCESS AND REACTOR FOR PRODUCING PHOSGENE

(71) Applicant: BASF SE, Ludwigshafen am Rhein (DE)

(72) Inventors: Torsten Mattke, Ludwigshafen am Rhein (DE); Gerhard Olbert, Ludwigshafen am Rhein (DE); Jens Ferbitz, Ludwigshafen am Rhein (DE); Koenraad Vandewalle, Antwerp (BE); Kai Thiele, Antwerp (BE); Peter Van Den Abeel, Antwerp (BE); Jim Brandts, De Meern (NL)

(73) Assignee: BASF SE, Ludwigshafen am Rhein (DE)

( * ) Notice: Subject to any disclaimer, the term of this patent is extended or adjusted under 35 U.S.C. 154(b) by 814 days.

This patent is subject to a terminal disclaimer.

(21) Appl. No.: 17/797,736

(22) PCT Filed: Jan. 26, 2021

(86) PCT No.: PCT/EP2021/051651

§ 371 (c)(1),
(2) Date: Aug. 5, 2022

(87) PCT Pub. No.: WO2021/156092

PCT Pub. Date: Aug. 12, 2021

(65) Prior Publication Data

US 2023/0074789 A1 Mar. 9, 2023

(30) Foreign Application Priority Data

Feb. 6, 2020 (EP) .................................... 20155928

(51) Int. Cl.

| | |
|---|---|
| ***C01B 32/80*** | (2017.01) |
| ***B01J 7/00*** | (2006.01) |
| ***B01J 8/00*** | (2006.01) |
| ***B01J 8/06*** | (2006.01) |
| ***B01J 12/00*** | (2006.01) |

(52) U.S. Cl.

CPC ................. *C01B 32/80* (2017.08); *B01J 7/00* (2013.01); *B01J 8/001* (2013.01); *B01J 8/067* (2013.01); *B01J 12/00* (2013.01); *B01J 2208/00194* (2013.01); *B01J 2208/0053* (2013.01); *B01J 2208/00548* (2013.01); *B01J 2208/00637* (2013.01)

(58) Field of Classification Search

CPC .... C01B 32/80; B01J 7/00; B01J 8/001; B01J 12/00; B01J 2208/00194; B01J 2208/0053; B01J 2208/00548; B01J 2208/00637

See application file for complete search history.

(56) References Cited

U.S. PATENT DOCUMENTS

| | | | | |
|---|---|---|---|---|
| 4,231,959 A * | 11/1980 | Obrecht | .................. | C01B 32/80 562/847 |
| 2012/0004446 A1* | 1/2012 | Mattke | .................. | C07C 263/10 422/198 |
| 2013/0072717 A1* | 3/2013 | Olbert | .................. | B01J 19/0053 562/847 |
| 2015/0165407 A1* | 6/2015 | Hollmann | ................ | B01J 8/067 422/202 |

FOREIGN PATENT DOCUMENTS

| | | | |
|---|---|---|---|
| DE | 102018113737 | A1 | 12/2019 |
| EP | 0134506 | A2 | 3/1985 |
| EP | 2896597 | A1 | 7/2015 |
| KR | 10-0936420 | B1 | 1/2010 |
| KR | 10-2012-0000078 | A | 1/2012 |

(Continued)

OTHER PUBLICATIONS

European Search Report for EP Patent Application No. 20155928.3, Issued on Jul. 14, 2020, 7 pages.

Mitchell, et al., "Selection of carbon catalysts for the industrial manufacture of phosgene", Catalysis Science & Technology, vol. 2, Issue 10, Apr. 12, 2012, pp. 2109-2115.

(Continued)

*Primary Examiner* — Stuart L Hendrickson

(74) *Attorney, Agent, or Firm* — Faegre Drinker Biddle & Reath LLP

(57) ABSTRACT

The invention relates to a process for producing phosgene by gas phase reaction of carbon monoxide and chlorine in the presence of a catalyst in a reactor that comprises a plurality of contact tubes arranged parallel to one another, which contact tubes are filled with the catalyst and around which at least one fluid heat transfer medium flows, a feed stream of a mixture of a chlorine input stream and a carbon monoxide input stream being conducted into the contact tubes and reacted to form a phosgene-containing product gas mixture, characterised in that the product gas mixture is discharged from the contact tubes at an outlet end of the contact tubes. The method according to the invention is characterised in that the gas phase reaction is carried out in the reactor such that the position of the highest temperature in a contact tube (hot spot) moves along the longitudinal axis of the contact tube at a predetermined rate of migration, the hot spot having a rate of migration in the longitudinal direction of the contact tubes which is in the range of 1 to 50 mm per day. The invention also relates to a reactor for carrying out the process.

8 Claims, 3 Drawing Sheets

(56) References Cited

FOREIGN PATENT DOCUMENTS

Figure 1:
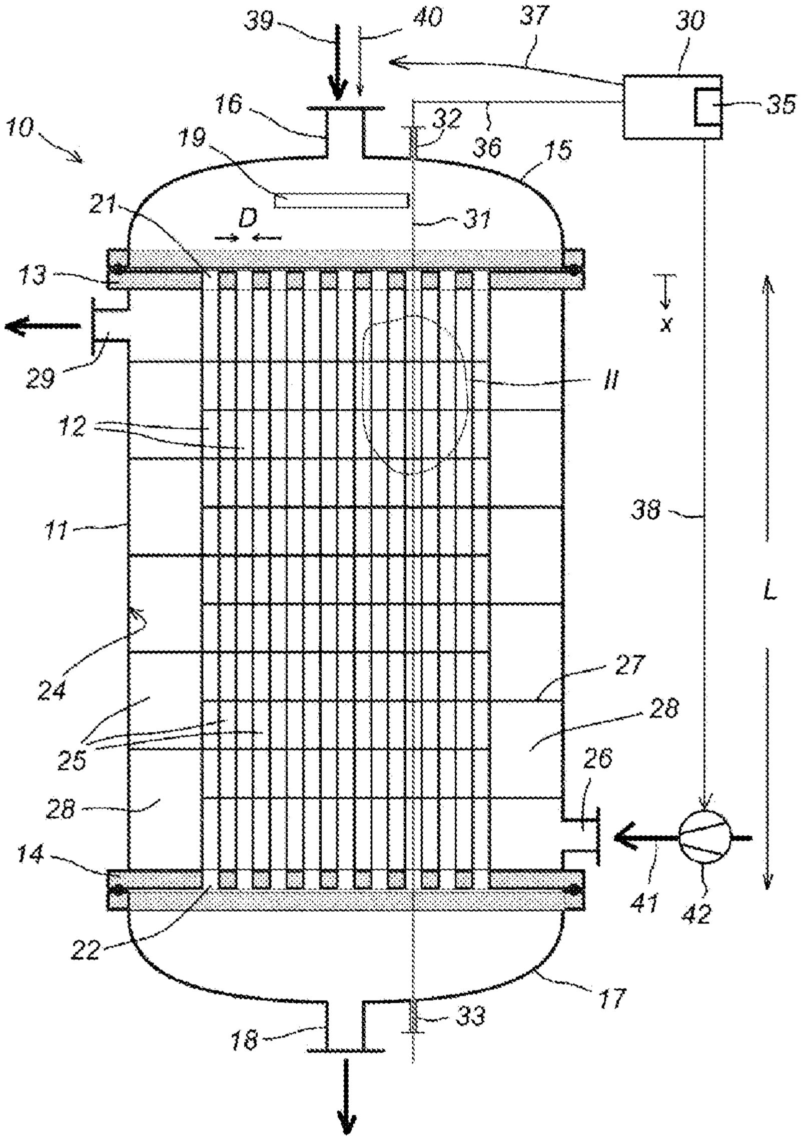

| | | | |
|---|---|---|---|
| WO | 03/72237 | A1 | 9/2003 |
| WO | 2004/052776 | A1 | 6/2004 |

OTHER PUBLICATIONS

International Search Report and Written Opinion received for PCT Patent Application No. PCT/EP2021/051651, mailed on Apr. 29, 2021, 21 pages (9 pages of English Translation and 12 pages of Original Document).

* cited by examiner

PROCESS AND REACTOR FOR PRODUCING PHOSGENE

CROSS-REFERENCE TO RELATED APPLICATIONS

This application is a national stage application (under 35 U.S.C. § 371) of PCT/EP2021/051651, filed Jan. 26, 2021, which claims benefit of European Application No. 20155928.3, filed Feb. 6, 2020, both of which are incorporated herein by reference in their entirety.

The invention relates to a process and to a reactor for production of phosgene by gas phase reaction of carbon monoxide and chlorine in the presence of a catalyst, especially in the presence of an activated carbon catalyst.

Phosgene is an important auxiliary in the production of intermediates and end products in virtually all branches of chemistry. In particular, phosgene is a widely used reagent for industrial carbonylation, for example in the production of isocyanates or organic acid chlorides. The greatest area of use in terms of volume is the production of diisocyanates for polyurethane chemistry, especially tolylene diisocyanate and diphenylmethane 4,4-diisocyanate.

Phosgene is produced on an industrial scale in a catalytic gas phase reaction of carbon monoxide and chlorine in the presence of a catalyst, for example an activated carbon catalyst, according to the following reaction equation:

$$CO + Cl_2 \rightleftharpoons COCl_2.$$

The reaction is highly exothermic with an enthalpy of reaction ΔH of −107.6 kJ/mol. The reaction is typically produced in a shell-and-tube reactor by the method described in Ullmann's Encyclopedia of Industrial Chemistry, in the "Phosgene" chapter (5th ed. vol. A 19, p 413 ff., VCH Verlagsgesellschaft mbH, Weinheim, 1991). In the process, granular catalyst having a grain size in the range from 3 to 10 mm, preferably 3.5 to 7 mm, is used in catalyst tubes having a typical internal diameter of up to 100 mm, typically between 35 and 70 mm and preferably between 39 and 45 mm. The elongated catalyst tubes have a longitudinal axis, with the length of the catalyst tubes in phosgene production on an industrial scale, measured in the direction of the longitudinal axis, being typically in the range from 1.5 m to 12 m. The catalyst tubes are typically filled with catalyst material apart from short sections at the start and at the end of the tubes, such that the bed height of the catalyst material corresponds essentially to the length of the catalyst tubes. The reaction typically commences at temperatures of 40 to 120° C. in the region of the inlet of the reactants into the catalyst material. In flow direction of the reactants, the temperature in the tubes rises rapidly along the longitudinal axis of the tubes with increasing distance from the gas entry opening, and typically reaches a temperature maximum while still in the first half of the tube (viewed from the inlet of the gaseous reactants), which is typically 400° C. or more and may be up to 600° C. This point of maximum temperature along the longitudinal axis of a catalyst tube is also referred to as "hotspot". Thereafter, the temperature falls again rapidly further along the catalyst tube, since a majority of the chlorine gas used has already been converted at the level of the hotspot, and there is less and less chlorine gas available for phosgene formation further along the catalyst tubes. In the reaction, it is customary to use carbon monoxide in excess in order to ensure that all the chlorine is converted and largely chlorine-free phosgene is produced over the length of the catalyst tubes, since chlorine can lead to unwanted side reactions in the subsequent use of phosgene.

The reaction can be conducted at ambient pressure, but is generally conducted at an elevated pressure of 3 to 7 bar. In this pressure range, the phosgene formed can be condensed downstream of the reactor with cooling water or other, for example organic, heat carriers, such that the condenser can be operated in a more economically viable manner.

A typical industrial scale reactor for production of phosgene is described, for example, in the applicant's international patent application WO 03/072237 A1.

A significant problem in the design of phosgene reactors is the removal of the heat of reaction formed. For this purpose, a heat carrier flows around the catalyst tubes of the shell-and-tube reactor, which discharges the heat of reaction that arises from the reactor. It has been found that the removal of heat is improved in the case of crossflow around the catalyst tubes. Therefore, it is customary to install baffle plates in the reactor that enable crossflow of the heat carrier around the catalyst tubes by virtue of a meandering flow regime of the heat carrier. The heat carrier may be a liquid that boils or does not boil under the given reaction conditions. In the case of evaporative cooling, as described, for example, in European patent application EP 01 34 506 A2, preference is given to using a liquid that boils under the given pressure conditions at typically 150 to 320° C., which is guided in a circuit through a typically water-cooled heat exchanger. It is also possible to combine liquid cooling and evaporative cooling in one reactor.

On account of the cooling of the catalyst tubes, as well as the above-described temperature profile in longitudinal direction of the catalyst tubes, a temperature profile also arises in the cross section of the catalyst tubes. Typically, the highest temperatures are attained in the centre of the catalyst tube, and the temperature declines toward the inner wall of the catalyst tube. In the bed, a temperature profile is then formed at right angles to the longitudinal axis in the cross section, which typically has the form of an inverted parabola with maximum in the center. The outward transport of the heat of reaction by the cooling medium is determined by the wall heat transfer from the reaction mixture and catalyst material at the inner wall of the catalyst tube, heat conduction by the shell material of the catalyst tube and heat transfer toward the cooling medium at the outer wall of the catalyst tube. Key factors here are the thermal conductivity of the catalyst tube material, and the temperature, flow rate and Reynolds number of reaction gas and cooling medium, but also the thermal conductivity of the catalyst material present in the catalyst tube.

In the case of reactors on an industrial scale, there are significant differences in coefficients of heat transfer over the reactor cross section at the interfaces between the catalyst tubes and the heat carrier, which are caused, for example, by the deflection of the heat carrier from transverse flow to longitudinal flow, but also by pressure drops of the heat carrier that flows within the shell space. The coefficients of heat transfer from regions having good heat transfer and regions having poor heat transfer within the reaction cross section of the reactor may quite possibly differ by a factor of 2. Accordingly, the catalyst tubes are less efficiently cooled in the regions with poor heat transfer. Another factor contributing to an increase in thermal stress on the wall material of the catalyst tubes is when the catalyst material used has high thermal conductivity, as is the case, for example, for activated carbons as catalyst materials. Especially in the region of the hotspot, which, as outlined above, may have temperatures of up to 600° C. in the center of a catalyst tube, distinctly elevated wall temperatures of the catalyst tubes may occur in spite of cooling. There may also be elevated thermal stress on the catalyst tubes in part-load operation since, on account of the lower efficiency of heat removal, larger hotspots are formed. In conjunction with the chlorine-containing atmosphere, therefore, in the case of prolonged action of high temperatures on the wall of the catalyst tubes, there may be corrosion phenomena. The effects essentially depend on the wall material used. Sensitivity to such corrosion damage is at its lowest for catalyst tubes made of nickel-base alloy and rises through materials such as stainless steels and duplex steels up to black steels. The corrosion rate in chlorine atmospheres depending on temperature is commonly known for different materials (see, for example, "*Materials Selector for Hazardous Chemical, Vol.* 3, *Hydrochloric Acid, Hydrogen Chloride and Chlorine*", MIT Publication MS-3, Elsevier Science).

This corrosion damage can lead up to a leak between product side and coolant side and hence to safety-critical states in the reactor. When water is used as cooling medium, aqueous HCl can be produced on contact with phosgene, which in turn leads to corrosion damage to further plant components. In particular, in the event of occurrence of corrosion damage or a leak, shutdown of the production plant and repair or even replacement of the reactor is required, which is associated with high costs resulting from production shutdown and capital costs.

Therefore, in the design of reactors, it is typically assumed that the catalyst tubes, depending on the material used, must have a thermal stress limit. For duplex steel which is frequently used for catalyst tubes, the thermal stress limit is typically in the range from about 170 to 200° C., and for stainless steels about 250° C. However, design of the operating conditions of the reactor aimed at compliance with the thermal stress limit for the catalyst tube walls within the abovementioned range limits the throughput and hence the capacity of the reactor to the design value chosen.

The throughput of the reactor can be specified here by what is called the area load or phosgene load of the reactor, defined as the amount of phosgene produced per unit time (typically reported in kg/s), based on the cross-sectional area of the catalyst, i.e. the sum total of the internal cross-sectional areas of the catalyst-filled catalyst tubes (typically reported in square meters). In order to control the heat of reaction, therefore, area loads between 0.5 and 2 kg of phosgene/$m^2$s are typically run in the prior art. The phosgene area load is thus essentially determined assuming full conversion of the component run in deficiency, i.e., for example, essentially by the chlorine feed in the case of a carbon monoxide excess.

The term "reactor" in the present application includes all components of a plant in which the chemical conversion of carbon monoxide and chlorine gas to phosgene takes place. Frequently, a reactor in this context is a single component defined by a reactor vessel. However, a reactor in the context of the present application may also comprise two or more components having separate reactor vessels arranged successively (in series), for example. In this case, the area load is based on the overall conversion, i.e. on the phosgene stream that leaves the last reactor component, for example the last reactor vessel.

The technical problem addressed by the present invention is that of providing a process for producing phosgene that enables an elevated reactor throughput without increasing the risk of reactor damage as a result of elevated thermal stress on the catalyst tubes. The invention also relates to a reactor for implementing the process of the invention.

This technical problem is solved by the process of the present claim 1. Advantageous developments of the process of the invention are the subject of the dependent claims.

The present invention therefore relates to a process for producing phosgene by gas phase reaction of carbon monoxide and chlorine in the presence of a catalyst in a reactor comprising a multitude of catalyst tubes arranged parallel to one another that are filled with the catalyst and around which at least one fluid heat carrier flows, in which a feed gas stream (or "feed stream" for short) of a mixture of a chlorine feed stream and a carbon monoxide feed stream is guided into the catalyst tubes at an inlet end of the catalyst tubes and is allowed to react in the catalyst tubes to give a phosgene-comprising product gas mixture, and the product gas mixture is removed from the catalyst tubes at an outlet end of the catalyst tubes. The process of the invention comprises performing the gas phase reaction in the reactor in such a way that the position of the highest temperature in a catalyst tube, i.e. what is called the hotspot, moves along the longitudinal axis of the catalyst tube at a defined speed of migration, where the hotspot has a speed of migration in longitudinal direction of the catalyst tubes in the range from 1 to 50 mm per day.

As already described above, it is a feature of the catalytic gas phase reactions considered in the context of the present invention that a characteristic temperature profile with a marked temperature peak, also referred to as the hotspot, is formed over the length of the catalyst tubes. If reaction conditions are unchanged, the position of this hotspot along the longitudinal axis of the catalyst tubes is unchanged, and so the catalyst tubes in this region are subjected to prolonged high thermal stress.

The invention is based on the finding that the design criteria used to date for reactors assume that the highest thermal stress to which a catalyst tube is exposed in the region of the hotspot affects one and the same region of the catalyst tube for a prolonged period. By contrast, the invention proposes reducing the thermal stress on the catalyst tubes by adjusting the operating conditions of the reactor such that, during operation of the reactor, the hotspot moves continuously along the longitudinal catalyst tube axis in flow direction of the reaction gases in the catalyst tube. Since the temperature profile drops rapidly in longitudinal direction of the catalyst tubes upstream and downstream of the hotspot (viewed in flow direction of the reaction gases), a given region of the catalyst tube in which the hotspot is currently present is exposed only briefly to the highest temperatures, such that the thermal stress in these regions is reduced overall. As a result, it is therefore possible to increase the capacity of the reactor since the wall temperatures may briefly be higher than was allowed according to existing design criteria without significantly increasing the corrosion risk as a result.

In the process of the invention, the hotspot, for example in a periodic movement, may move from a region at the inlet end of a catalyst tube in the direction of the outlet end and back in the direction of inlet end. Preferably, however, there is no reversal of direction in the movement of the hotspot, such that the hotspot, in a preferred embodiment of the process of the invention, moves from a region close to the inlet end of a catalyst tube in the direction of the outlet end.

It is preferably the case in the process of the invention that the hotspot moves continuously, with continuous movement or shifting of the hotspot here being considered to mean that within the scope of the typical periods of operation of an industrial phosgene reactor, which are typically in the region of many weeks or months. On this timescale, for example, movements of the hotspot that are detectable within the scope of measurement accuracy only over a period of several days should still be considered to be continuous. It is likewise the case that, for example, a periodic movement profile of the hotspot in the catalyst tube associated with regular reversals of the direction of movement should be considered to be a continuous movement within the scope of the present invention to understand, even though the speed of migration is briefly zero at the points of reversal of movement.

According to the invention, the gas phase reaction is conducted in such a way that the migration of the hotspots has a speed of migration in longitudinal direction of the catalyst tubes in the range from 1 to 50 mm per day. The speed of migration of the hotspot is preferably in the range from 2 to 25 mm per day.

The speed of migration of the hotspot can be measured, for example, by installing two or more temperature measurement points along the tube axis of a catalyst tube. The travel time taken for a particular temperature value to move from one measurement position to the next can be used directly to conclude the speed of migration of the hotspot since it is not only the hotspot but essentially the entire temperature profile that migrates through the axis of the tube. Since there is no significant change in the temperature profile itself, there is no need to measure directly in the hotspot; instead, the speed of migration of the hotspot is found in a corresponding manner by measuring the migration of a particular temperature point outside the hotspot. In fact, the measurement accuracy can even be increased if measurement is effected not directly in the hotspot but in a steeply declining flank before or after the hotspot, since it is here that the changes in temperature caused by the movement of the hotspot or of the entire temperature profile are at their greatest.

According to the invention, the hotspot moves in a controlled manner with a defined speed of migration along the longitudinal axis of the catalyst tube. The word "controlled" is understood not just in the narrower meaning of active control within the scope of control technology, in which the speed of migration of the hotspot is measured as the controlled variable and is influenced by suitable manipulated variables in such a way that it assumes the desired defined target value. In the context of the present invention, the word "controlled" also includes passive control, in which, for example using preliminary experiments and/or suitable reaction models, the influence of different operating parameters and catalyst materials on the speed of migration of the hotspot is examined, and operating parameters and catalyst are chosen such that the desired, i.e. defined, speed of migration can be achieved in real operation. In these cases, it is possible to dispense with any actual measurement of the speed of migration.

In this context, it is possible to achieve controlled migration movement of the hotspot in the catalyst tubes in different ways.

It is known, for example, that the specific operating conditions influence the position of the hotspot along the longitudinal axis of the catalyst tubes which is established after the reactor has been started up. In one variant of the process of the invention, it is therefore possible to bring about continuous movement of the hotspot by controlled variation of the operating conditions. It is known, for example, that phosgene load, CO excess, pressure, coolant temperature, coolant flow, partial recycling of excess CO (CO recycling) have an influence on the position of the hotspot along the longitudinal axis of the catalyst tubes which is established after the reactor has been started up. In the context of the process of the invention, therefore, controlled variation of the operating conditions can achieve controlled migration movement of the hotspot. It is thus possible to exploit the fact that measures that increase the reaction rate move the position of the hotspot toward the inlet end of the catalyst tubes, i.e., for example, higher CO excess, higher pressure, higher coolant temperature or lower coolant flow.

The increase in CO excess can preferably be brought about by partial recycling of the product gas mixture into the feed stream. This measure can not only influence the operating conditions with regard to the speed of migration of the hotspot but also lower the specific carbon monoxide consumption. For this purpose, the phosgene product of value is separated from the product gas mixture, for example by condensation as liquid phosgene. A substream is then separated from the remaining gas stream, which is recycled as recycle stream into the feed stream upstream of the phosgene reactor. The recycle stream frequently still has a carbon monoxide concentration in the range from 20% to 60% by weight, based on the total weight of the recycle stream.

Since the position of the hotspot, depending on the specific variations in operating conditions, can be moved in the direction of the inlet end or in the direction of the outlet end of a catalyst tube, it is possible via the controlled influencing of the operating conditions also to achieve periodic movements of the hotspot in a catalyst tube.

Alternatively or additionally to a variation in the operating conditions, controlled movement of the hotspot can also be achieved by bringing about continuous movement of the hotspot through controlled deactivation of the catalyst in the catalyst tubes.

Increasing deactivation of the catalyst is associated with a shift in the temperature profile in the direction of the outlet end of the catalyst tubes, since lower conversion of the reactants takes place in the inlet region of the catalyst tubes on account of the already partly deactivated catalyst material, and so even more reactants are available for conversion further downstream than before the partial deactivation of the catalyst material. By means of controlled gradual deactivation of the catalyst material, it is consequently possible to create only movement of the hotspot or a shift in the temperature profile in the direction of the outlet end of the catalyst tubes.

According to the invention, the deactivation of the catalyst material is then controlled in such a way that the desired speed of migration of the hotspot is achieved.

In one variant of the process of the invention, it is possible to use a catalyst that is subject to continuous deactivation under the operating conditions, for example a catalyst under the thermal conditions of the catalytic gas phase reaction shows continuous deactivation. For establishment of the desired speed of migration, the operating conditions may be adjusted in accordance with the desired rate of deactivation, to the extent possible without impairing the throughput. Additionally or alternatively, chemical modification of the catalyst is also conceivable in order to create the desired speed of migration of the hotspot by virtue of controlled deactivation resulting therefrom. For example, the catalyst may be diluted with inert material, or subjected to thermal treatment or chemical modification.

Controlled deactivation of the catalyst can also be achieved by controlled chemical deactivation of the catalyst by reaction with the components of the gas mixture that flows through the catalyst tubes. For this purpose, the catalytic gas phase reaction is conducted in such a way that the catalyst, over time, is converted to a catalytically inactive or at least less active species by reaction with components from the gas mixture. The reactants for deactivation of the catalyst may be reactants of the catalytic gas phase reaction, i.e. carbon monoxide or chlorine in the case of phosgene production. It is alternatively possible to use products or by-products from the catalytic gas phase reaction for controlled deactivation of the catalyst. In order to reduce the decrease in the yield, preference is given to using by-products for deactivation of the catalyst, in which case the reaction conditions can be adjusted in such a way that by-products are formed in the amount desired for the deactivation and hence for the speed of migration of the hotspot. Moreover, the gas stream may be supplied with additional components that are not involved in the catalytic gas phase reaction but have the specific aim of continuous deactivation of the catalyst. In the latter case, the advantage arises that the actual catalytic gas phase reaction and the controlled deactivation of the catalyst can be optimized independently of one another, meaning that the speed of migration of the hotspot can be optimized without any disadvantageous feedback affecting phosgene formation. Suitable components that may be supplied to the gas stream are, for example, oxygen, chlorine oxides and mixtures thereof. Rather than active supply of such deactivating components, it is also possible to achieve the desired concentration thereof in the gas stream by not fully purifying the feed streams that form the gas stream in upstream process steps. For example, a chlorine gas stream coming from a chloralkali electrolysis may at first still comprise impurities such as oxygen and chlorine oxides that are typically removed from the gas stream prior to a further use of the chlorine gas in a chlorine purification step. In the process of the invention, the purification of chlorine can be adjusted so as to maintain a concentration of impurities in the chlorine gas stream required for controlled deactivation of the catalyst. Further suitable components that may be supplied to the feed stream in order to continuously deactivate the catalyst are, for example, metal chlorides, for example iron chlorides, nickel chlorides or molybdenum chlorides. These may be actively added to the feed stream. However, the chlorine gas in the feed stream may also be run deliberately through metallic conduits in which a small portion of the chlorine gas forms metal chloride compounds with components of the inner walls of the conduits that are then introduced into the phosgene reactor together with the chlorine gas stream.

In the process of the invention, it is possible to use different catalysts. However, preference is given to using an activated carbon as catalyst in the industrial production of phosgene by catalytic gas phase reaction. In this case, deactivation of the activated carbon catalyst can be achieved, for example, by choosing reaction conditions that lead to increased reaction of carbon and chlorine, for example to form carbon tetrachloride, such that catalyst material is discharged continuously in the form of carbon tetrachloride over the course of the period of operation, which equates to partial deactivation of the total amount of catalyst material originally used. Deactivation of activated carbon as catalyst can also be achieved, for example, by using a feed stream comprising a deactivating component, for example oxygen or chlorine oxides. For example, it is possible to use a chlorine feed stream in which the oxygen content is greater than 10 ppm, preferably greater than 20 ppm, in order to enable continuous deactivation of the catalyst by burnoff of the activated carbon to form carbon monoxide/carbon dioxide.

The operating conditions or the deactivation of the catalyst should be chosen here such that the integral loss of material from the walls of the catalyst tubes is not more than 0.1 mm per year, preferably not more than 0.05 mm per year and more preferably not more than 0.02 mm per year.

The integral loss of material s up to time t after commencement of operation at location x along the longitudinal axis of a catalyst tube is found here as a function of a corrosion rate $K_R$ dependent on the catalyst material and the temperature T as:

$$s_x = \int_{t=0}^{\tau} K_R(T_{x,t})dt$$

Given a known corrosion rate $K_R$, as documented for numerous materials used in reactor construction in literature sources such as the abovementioned "*Materials Selector for Hazardous Chemical*", and given known evolution of the temperature profile $T_{x,t}$ in the catalyst tube with time, it is thus possible to ascertain the integral loss of material s.

Preferably, the feed stream in the process of the invention has a stoichiometric excess of carbon monoxide to chlorine of 0.1 to 50 mol %, such that virtually full conversion of chlorine is assured. If a fluctuating chlorine concentration in the chlorine feed stream has to be expected, the excess of carbon monoxide chosen will be comparatively high, but in general, for reasons of cost, the excess chosen will be as small as possible, such that full chlorine conversion is still assured.

The feed stream is preferably fed in at an absolute pressure in the range from 0.5 to 20 bar. More preferably, the feed stream is fed in at an elevated pressure, for example at an absolute pressure of 3 to 7 bar (absolute). The higher the pressure of the reaction mixture formed at the reactor outlet, the higher the temperatures at which the phosgene present in the reaction mixture can be condensed. Preferably, the pressure of the reaction mixture at the reactor outlet is still sufficiently high that the phosgene can be at least partly condensed with cooling water.

In a specific embodiment of the invention, the reactor is divided into at least two cooling zones in longitudinal direction of the catalyst tubes, which are separated from one another by intermediate plates, for example. It is possible to use different heat carriers in the various cooling zones, the selection of which may be matched to the thermal conditions in the respective cooling zones. But since full sealing of the catalyst tube apertures in the intermediate plates is technically complex, such that leaks typically have to be expected in practice, preference is given to using the same heat carrier in the different cooling zones. In that case, it is possible, for example, to perform evaporative cooling in a cooling zone having particularly high evolution of heat, while liquid cooling is performed in another cooling zone. In the case of evaporative cooling, preference is given to providing no baffle plates or specially designed baffle plates where backup of ascending gas bubbles is prevented. When the reactor has multiple cooling zones, the establishment of controlled operating conditions for a defined speed of migration of the hotspot is also facilitated.

The fluid heat carrier used may be different substances and substance mixtures which, on account of their heat capacity or on account of the their enthalpy of evaporation, for example, are suitable for removing the heat of reaction. Typically, a liquid heat carrier is used, for example water, dibenzyltoluene (Marlotherm) or monochlorobenzene.

The process of the invention, especially when the speed of migration of the hotspot is caused by controlled deactivation of the catalyst, may be performed in a conventional reactor for production of phosgene by catalytic gas phase reaction of carbon monoxide and chlorine. The operating conditions and catalyst properties, especially the corrosion rate of the catalyst, that are required for adjustment of the speed of migration can be ascertained by preliminary experiments and adjusted appropriately in the reactor. Preferably, however, the reactor in this case also has a control device for monitoring the speed of migration of the hotspot. The control device here comprises at least one temperature measurement probe for determining the temperature in at least one catalyst tube at at least two measurement points spaced apart along the longitudinal axis of the catalyst tube. The control device then also comprises an evaluation unit that ascertains the speed of migration of the hotspot from the measurement of temperature. For instance, the speed of migration W speed of migration can be concluded directly from the travel time $\Delta t$ taken for a particular temperature value to move from one measurement point to the next, and the distance $\Delta x$ between the measurement points along the longitudinal axis of a catalyst tube, according to the formula:

$$W = \Delta x / \Delta t$$

In a further embodiment of the invention, the control of the speed of migration of the hotspot along the longitudinal axis of the catalyst tubes is not based on an actual temperature measurement in at least one catalyst tube. This is because it is also possible to calculate the current temperature profile in the catalyst tubes and changes therein, and hence also the speed of migration of the hotspot, from a reactor model. Inputs to the reactor model include the current operating conditions and the influence of variations thereof on the position of the hotspot. Using preliminary experimental studies, it is especially possible to establish a kinetic model for the change in the catalyst as a result of the operating conditions, including the consideration of any impurities in the feed stream. A reactor model usable in the context of the present invention is described, for example, by Michell et al. in "*Selections of carbon catalyst for the industrial manufacture of phosgene*", Catal. Sci. Technol., 2012, 2, 2109-2115, fora reactor with activated carbon catalyst. Inputs into the reactor model described therein additionally include a kinetic model for the reaction of the carbon catalyst with chlorine gas and any oxygen components in the feed stream. It can be inferred from the model described that, for example, an exact measurement of the chlorine content in the product gas stream can be used in order to ascertain the temperature profile in the catalyst tubes and to regulate the speed of hotspot migration in the context of the present invention.

The invention also relates to a reactor for production of phosgene by gas phase reaction of carbon monoxide and chlorine in the presence of a catalyst, especially in the presence of an activated carbon catalyst, comprising a multitude of catalyst tubes having inlet ends and outlet ends that are arranged parallel to one another and are filled with the catalyst and are welded into a tube sheet at their inlet ends and at their outlet ends, with supply of the reactants at the upper end of the catalyst tubes and discharge of the gaseous reaction mixture at the lower end of the catalyst tubes, in each case via a hood, and with feed and drain devices for a fluid heat carrier into a shell space between the catalyst tubes, wherein the reactor of the invention has a control device for monitoring the speed of migration of the position of the highest temperature in the catalyst tubes (hotspot).

In a preferred embodiment, the control device has at least one temperature measurement probe for determining the temperature in at least one catalyst tube at at least two measurement points spaced apart along the longitudinal axis of the catalyst tube and an evaluation unit. The temperature measurement probe may be executed, for example, as a multiple thermocouple, with numerous measuring elements for detecting the temperature disposed along the longitudinal axis of the temperature measurement probe.

As already elucidated above, ascertaining the speed of migration of the hotspot does not require measurement of the temperature at the position of the highest temperature, i.e. at the hotspot itself; instead, the temperature may be measured anywhere in the temperature profile, preferably at a point with a high temperature gradient, i.e. at a point at which the temperature changes significantly along the longitudinal axis of the catalyst tube.

The evaluation unit for ascertaining the speed of migration of the hotspot preferably comprises a microprocessor that also comprises means of measuring time, in order to calculate the speed of migration W from temperature travel times according to the above formula.

The control device, for monitoring of the speed of migration of the hotspot, preferably also has control means for varying the operating conditions of the reactor, in order to adjust the speed of migration to a desired value or to vary the speed of migration in operation. If, for example, in one variant of the process of the invention, the migration of the hotspot is achieved via active or passive deactivation of the catalyst, it is also possible with increasing operating time to reduce the speed of migration since the thermal stress on the catalyst tube walls is already reduced on account of the increasing deactivation of the catalyst.

In a closed-loop control circuit, the control means for varying the operating conditions correspond to the actuating means with which the speed of migration of the hotspot can be influenced as controlled variable. The actuating means can act on a wide variety of different manipulated variables, such as coolant flow rate, coolant temperature, area load, concentration ratios in the feed stream, etc. Typically, the scope of closed-loop control is limited so as to prevent any reduction in the phosgene yield.

In the case of active deactivation of the catalyst by addition of specific deactivating components to the feed stream, the actuating means may also act on the concentration or volume flow rate of the corresponding deactivation components. For example, the control means may act on the addition of oxygen or chlorine oxides to the feed stream.

The catalyst tubes of the reactor of the invention may have a length L in the range from 1.5 to 12 m, preferably from 2.5 to 8 m. Particular preference is given to reactor tube lengths in the range from 6 to 6.5 m. Typically, there is about 25 cm at the start and at the end of a catalyst tube that is free of catalyst since the removal of heat in this region is inadequate on account of the installation position of the tubes.

In the reactor is disposed a bundle, i.e. a multitude of catalyst tubes, parallel to one another in longitudinal reactor direction.

The catalyst tubes are formed from a corrosion-resistant material, for example stainless steel, preferably duplex steel 1.4462, stainless steel 1.4571 or stainless steel 1.4541, or else from nickel-base alloys or from nickel. The tube sheets or else the entire reactor are preferably also formed from the aforementioned materials, especially from duplex or stainless steel. Reactor shell and reactor trays may, however, also be manufactured from less costly metals and metal alloys, for example from black steel. Components that come into contact with reactants may then be plated with a protective layer of higher-value materials.

Each catalyst tube preferably has a wall thickness in the range from 2.0 to 4.0 mm, especially from 2.5 to 3.0 mm, and an internal tubular diameter in the range of up to 100 mm, typically between 35 and 70 mm and preferably between 39 and 45 mm.

The catalyst tubes are secured, preferably welded, into tube sheets in a fluid-tight manner at either end. The tube sheets likewise consist of a corrosion-resistant material, preferably stainless steel, especially duplex steel, more preferably of the same material as the catalyst tubes. The seal to the tube sheets is preferably made by welding. For example, at least two layers of weld seams may be provided per tube, which are produced at offset angles, for example by 180°, such that the start and end of the respective layers are not superposed.

Both ends of the reactor are bounded by hoods on the outside. The reaction mixture is supplied to the catalyst tubes through one hood; the product stream is withdrawn through the hood at the other end of the reactor.

In the hood supplied with the reaction mixture is preferably disposed a gas distributor for homogenization of the gas stream, for example in the form of a plate, especially a perforated plate.

Baffle plates are preferably disposed in the interspace between the catalyst tubes at right angles to longitudinal reactor direction. The baffle plates may, for example, be formed in such a way that successive baffle plates have mutually opposite circular segment-shaped cutouts toward the inner wall of the reactor, in order to assure a meandering flow of the fluid heat carrier. In another embodiment, the bundle of tubes may also be divided into two bundles, in which case one baffle plate in each case has two mutually opposite circular segment-shaped cutouts, and the respective immediately subsequent baffle plate has a passage opening in a central region of the reactor. The effect of the baffle plates is to deflect the heat carrier circulating in the interior of the reactor in the interspace between the catalyst tubes, in such a way that there is transverse crossflow of the heat carrier around the catalyst tubes, which improves the removal of heat. The number of baffle plates is preferably about 6 to 35. The baffle plates are preferably arranged equidistantly with respect to one another; more preferably, however, the lowermost and uppermost baffle plates are each further removed from the tube sheet than the distance between two adjacent baffle plates, for example by about 1.5 times the distance. In the region of the passage openings, the reactor lacks tubes, i.e. is essentially free of catalyst tubes. In one embodiment, it is possible here for individual catalyst tubes to be disposed in the passage openings of the deflection regions. In a further embodiment, the passage openings are entirely free of catalyst tubes. Preferably, all baffle plates leave identical passage openings clear. The area of each passage opening is preferably 5% to 20%, especially 8% to 14%, of the reactor cross section.

Preferably, the baffle plates are not arranged around the catalyst tubes with sealing, and permit a leakage flow of up to 40% by volume of the total flow of the heat carrier. For this purpose, gaps in the range from 0.1 to 0.6 mm, preferably from 0.2 to 0.4 mm, are provided between the catalyst tubes and baffle plates. It is advantageous to configure the baffle plates in a liquid-tight manner toward the inner reactor wall except for the regions of the passage openings, such that no additional leakage flow occurs there.

The baffle plates may be formed from a corrosion-resistant material, preferably stainless steel, especially duplex steel, preferably in a thickness of 8 to 30 mm, preferably of 10 to 20 mm. But since baffle plates do not come into contact with reactants and the catalyst tubes are typically passed through the openings of the baffle plates with a certain clearance, the baffle plates may also be manufactured from less expensive materials such as black steel.

In a preferred embodiment, the shell space of the reactor of the invention is divided into at least two cooling zones separated by intermediate plates. The intermediate plates are preferably manufactured from higher-quality material, since the openings in the intermediate plates through which the catalyst tubes are guided should form a very tight seal with the outer shell of the catalyst tubes by rolling-on.

The catalyst tubes are filled with a solid-state catalyst, preferably activated carbon. The catalyst bed in the catalyst tubes preferably has a gap volume of 0.33 to 0.6, especially of 0.33 to 0.45. The gap volume is based on the catalyst bed, in which the solid-state catalyst is assumed to be an all-active body. The porosity of the catalyst bodies themselves, which may be 50% for example, is not taken into account.

Figure 2:
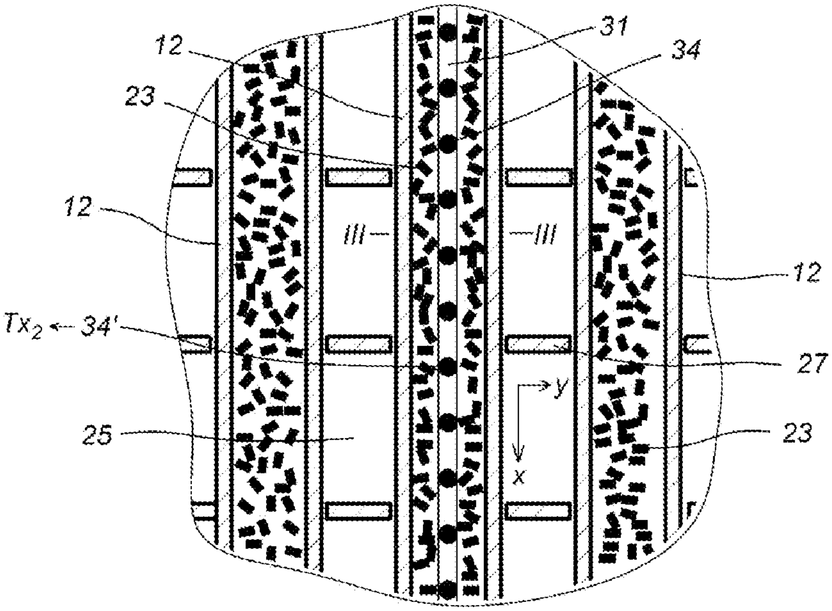
Figure 3:
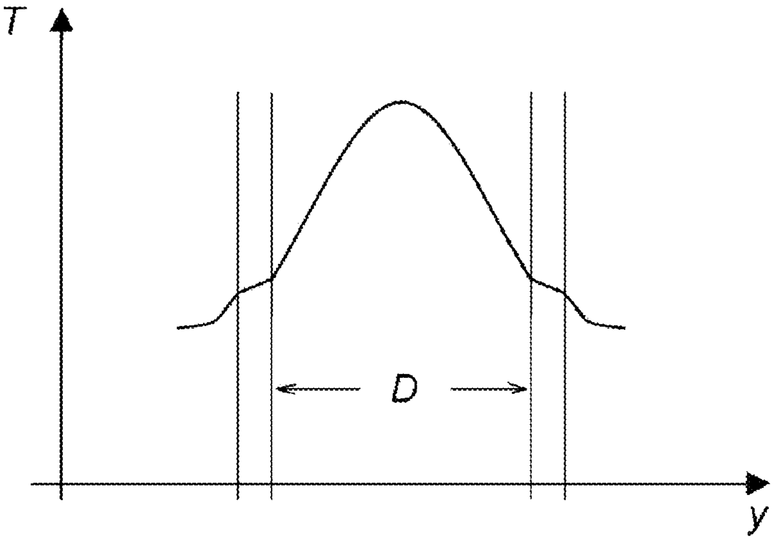
Figure 4:
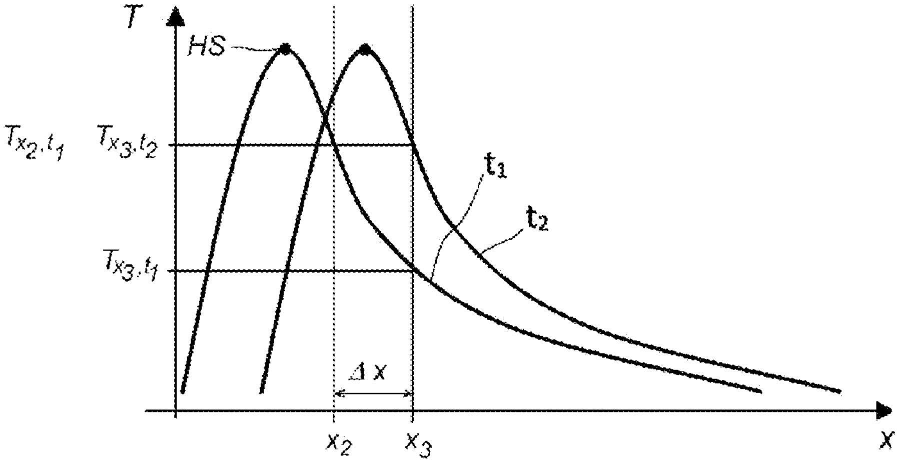
Figure 5:
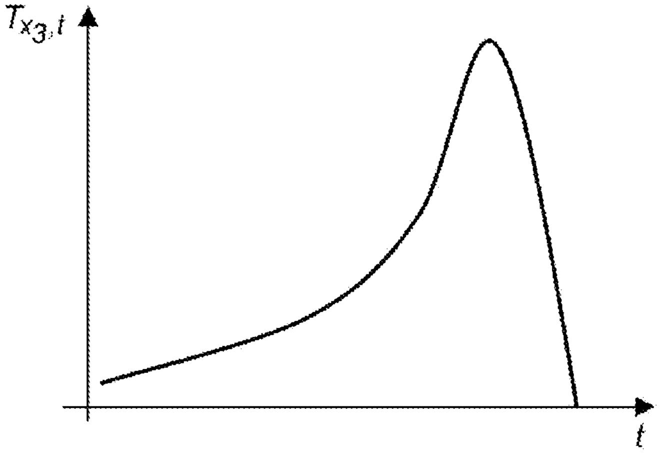

The invention is elucidated in detail hereinafter by schematic drawings and by an example:

The figures show:

FIG. 1 a schematic diagram of a reactor suitable for performance of the process of the invention;

FIG. 2 a detail view of the region of the reactor identified by II in FIG. 1;

FIG. 3 a temperature profile over the cross section of a catalyst tube of the reactor of FIG. 1 along a line II-Ill in FIG. 2;

FIG. 4 a temperature profile along the longitudinal axis of a catalyst tube of the reactor of FIG. 1 at different times; and FIG. 5 a temperature profile measured at location x as a function of time.

FIG. 1 shows a phosgene reactor 10 suitable for performance of the process of the invention, having an essentially cylindrical reactor shell 11. The reactor 10 shown in longitudinal section in FIG. 1 has a bundle of catalyst tubes 12 that are secured with sealing parallel to one another in longitudinal direction of the reactor 10 in upper and lower tube sheets 13, 14. At the two ends of the reactor are respectively provided an upper hood 15 with an inlet stub 16, and a lower hood 17 with an outlet stub 18. In the upper hood 15 is disposed a gas distributor 19 for homogenization and distribution of the gas flows over the reactor cross section. The catalyst tubes 12 open into the upper hood 15 via inlet ends 21, and into the lower hood 17 via outlet ends 22.

The reactant mixture is introduced via the inlet stub 16 and distributed via the gas distributor 19 and between the inlet ends 21 of the catalyst tubes 12. The catalyst tubes 12, in the example shown, consist of 1.4462 duplex steel and have a typical length L of about 6 m, corresponding essentially to the bed height of the catalyst present in the catalyst tubes. The catalyst tubes each have an internal diameter D of 39.3 mm and are filled with cylindrical activated carbon catalyst particles 23 (cf. FIG. 2) of diameter 4 mm and length 5 mm. After flowing through the catalyst tubes 12, the reaction mixture flows out of the outlet ends 22 into the lower hood 17 and is discharged via the outlet stub 18.

Between the catalyst tubes 12 themselves, and between the catalyst tubes 12 and an inner wall 24 of the reactor is provided a shell space 25 through which a liquid heat exchange medium can flow. For this purpose, a fluid heat carrier (not shown) is introduced in countercurrent to the gas flow of the reaction gases at the lower end of the reactor 10 via an entry stub 26. The heat carrier is guided in a meandering flow through the reactor by means of baffle plates 27 disposed at right angles to the longitudinal direction of the reactor, each of which has clear alternating passage openings 28 in the edge region of the reactor, and exits again from the shelf space 25 of the reactor 10 via an exit stub 29. The reactor 10 lacks tubes in the regions of the passage openings 28 since only inadequate cooling of the catalyst tubes would be possible in these regions as a result of the transition of the coolant flow from a transverse flow to a longitudinal flow.

In the example shown, the reactor 10 has one cooling zone. In alternative embodiments, the reactor may alternatively have two or more, for example two, separate cooling zones that are separated from one another by intermediate plates. In this case, the cooling zones may be cooled with different heat carriers. However, preference is given to using the same heat carrier adjacent cooling zones since the openings in the intermediate plates can be fully sealed only with very great difficulty in respect of the passage through the catalyst tubes. Even when the same heat carrier is used, however, it is possible to use different cooling schemes. For example, it is possible to use a liquid coolant that removes heat by means of evaporative cooling in the first cooling zone, while the heat is removed in the second cooling zone by pure liquid cooling.

FIG. 1 also shows a schematic of a control device 30 for monitoring the speed of migration of the position of the hotspot. The control device 30 comprises at least one temperature measurement probe 31 which is introduced into a catalyst tube 12 via an upper stub 32 or a lower stub 33. The temperature measurement probe may also be executed in a divided manner, such that one part of the probe is introduced into the catalyst tube 12 from the bottom and one part of the probe from the top.

FIG. 2 shows an enlarged detail of a region of the reactor cross section of FIG. 1, identified by II in FIG. 1. Sections of three catalyst tubes 12 alongside one another are apparent, surrounded by a shell space 25 through which the fluid heat carrier flows. The temperature measurement probe 31 is in the middle catalyst tube 12. What are shown are, apart from the baffle plates 2 and, for orientation, the direction arrows that indicate the longitudinal axis of the catalyst tubes 12 (direction arrow x) and a direction in the cross section of the catalyst tubes at right angles to longitudinal direction (direction arrow y). As can be seen in the detail diagram of FIG. 2 in particular, the temperature measurement probe 31 is preferably executed as a multiple thermocouple, with numerous measuring elements 34 disposed along the longitudinal axis of the temperature measurement probe 31 in order to ascertain a temperature profile in the catalyst tube. Typically, the distances between the individual measuring elements are in the region of 50-100 mm, preference being given to a tighter arrangement of the measuring elements particularly in the region of the hotspot, in order to increase the accuracy of the closed-loop control of the speed of migration of the hotspot. Each measuring element 34 gives a temperature value $Tx_i$ for a point x along the longitudinal axis of the catalyst tube that corresponds to the distance of the respective measuring element from the inlet end 21 of the catalyst tube 12 (indicated schematically in FIGS. 1 and 2 by the arrow x). In FIG. 2, a temperature value $Tx_2$ is assigned by way of example to a measuring element 34'. Where reference is made hereinafter to temperature values $Tx_1$, $Tx_2$, $Tx_3$, $Tx_4$, this does not necessarily mean that these are temperature values from immediately successive measuring elements 34, but it is the case that a temperature value $Tx_{i+1}$ is measured by a measuring element further removed from the inlet end 21 than a measuring element that measures the temperature value $Tx_i$.

As indicated schematically in FIG. 1 by the data link 36, the temperature measurement probe 31 transmits the temperature data $Tx_1$, $Tx_2$, $Tx_3$, $Tx_4$, . . . to the control device 30. The control unit 30 has an evaluation unit 35 that uses the data supplied from the temperature measurement probe, the known distance of the measuring elements 34 of the temperature measurement probe from the inlet end 21 and hence also the distance of the measuring elements from one another, and an internal or external clock of the evaluation unit 35 to ascertain the speed of migration of the hotspot in the catalyst tube 12. When the speed of migration ascertained varies from a defined target speed of migration, the evaluation unit 35 may manipulate suitable manipulated variables in order to adjust the speed of migration of the hotspot according to the setpoint.

FIG. 1 shows a schematic of manipulations of different manipulated variables by arrows 37 and 38. Arrow 37 is supposed to symbolize that the control device 30 can manipulate the properties of the feed stream 39 (for example the temperature and composition thereof) and/or any optional addition of an added feed stream 40 comprising components that at least partly deactivate the catalyst. Arrow 38 symbolizes that the control device 30 manipulates the properties of the coolant stream 41, for example the temperature thereof and/or, via control of a coolant pump 42, the volume flow rate thereof.

FIG. 3 shows a temperature profile along a diameter line III-III, shown in FIG. 2, of a cross section through a catalyst tube 12 at right angles to the longitudinal axis of the catalyst tube. What is apparent is an essentially parabolic progression of the temperature profile within the catalyst tube 12 with diameter D, with the highest temperature attained in the center of the catalyst tube. The temperature then drops toward the cooled tube wall of the catalyst tube. Within the tube wall, the temperature drops essentially in a linear manner to the temperature of the heat carrier interface at the outer wall of the catalyst tube 12. Within the coolant interface, there is a further, essentially linear temperature drop caused by the external heat transfer to the bulk temperature of the fluid heat carrier.

FIG. 4 shows the migration of a typical temperature profile of a catalyst tube from industrial phosgene synthesis, which is achieved, for example, by controlled deactivation of the catalyst in the catalyst tube. What are shown are two temperature profiles $Tt_1$ and $Tt_2$ that have been recorded at different times $t_1$ and $t_2$. It can be seen that the shape of the temperature profile does not change significantly at different times, but is primarily shifted along the longitudinal axis x of the catalyst tube. Therefore, the speed of migration of the hotspot HS need not necessarily be measured at the maximum of the temperature profile. If the same temperature T is measured at different times at different measurement points, the speed of migration of the hotspot is found, as already elucidated above, via the formula $W=\Delta x/\Delta t$, with $\Delta x=x_3-x_2$ and $\Delta t=t_2-t_1$.

FIG. 5 shows the progression of the temperature against time at an individual measurement point (here the Mac measurement point $x_3$ from FIG. 4). The temperature profile against time, with known corrosion rate $K_R(T)$, can be used to determine the integral removal of material at this point.

The invention claimed is:

1. A process for producing phosgene by gas phase reaction of carbon monoxide and chlorine in the presence of a catalyst in a reactor comprising a multitude of catalyst tubes arranged parallel to one another that are filled with the catalyst and around which at least one fluid heat carrier flows, in which a feed stream of a mixture of a chlorine feed stream and a carbon monoxide feed stream is guided into the catalyst tubes at an inlet end of the catalyst tubes and is allowed to react in the catalyst tubes to give a phosgene-comprising product gas mixture, and the product gas mixture is removed from the catalyst tubes at an outlet end of the catalyst tubes, which comprises performing the gas phase reaction in the reactor in such a way that the position of the highest temperature in a catalyst tube (hotspot) moves along the longitudinal axis of the catalyst tube at a defined speed of migration, where the hotspot has a speed of migration in longitudinal direction of the catalyst tubes in the range from 1 to 50 mm per day;

wherein a continuous movement of the hot spot is effected by controlled change of the operating conditions, wherein the operating conditions are effected by partial recycling of the product gas mixture into the feed stream and/or a continuous movement of the hot spot is effected by controlled deactivation of the catalyst in the contact tubes; and wherein the operating conditions are selected such that integral loss of material from walls of the catalyst tubes is not more than 0.1 mm per year.

2. The process according to claim 1, wherein the position of the hotspot moves continuously in the direction of the outlet end of the catalyst tubes.

3. The process according to claim 2, wherein continuous movement of the hotspot is brought about by controlled deactivation of the catalyst in the catalyst tubes.

4. The process according to claim 3, wherein the catalyst is continuously chemically deactivated, by addition of oxygen to the feed stream.

5. The process according to claim 1, wherein continuous movement of the hotspot is brought about by controlled variation of the operating conditions.

6. The process according to claim 1, wherein the feed stream has a stoichiometric excess of carbon monoxide to chlorine of 0.1 to 50 mol %.

7. The process according to claim 1, wherein the feed stream is fed in at an absolute pressure in the range from 0.5 to 20 bar.

8. The process according to claim 1, wherein the at least one fluid heat carrier flows around the catalyst tubes in separate cooling zones.

* * * * *